US010703507B2

(12) United States Patent
Comerford

(10) Patent No.: US 10,703,507 B2
(45) Date of Patent: Jul. 7, 2020

(54) EXTENDABLE AND RETRACTABLE PARCEL RECEIVING APPARATUS FOR DELIVERY DRONES

(71) Applicant: DEKA TECHNOLOGY CO., LIMITED, Hong Kong (CN)

(72) Inventor: Ernest Comerford, Queensland (AU)

(73) Assignee: Deka Technology Co. Ltd., Kowloon (HK)

( * ) Notice: Subject to any disclaimer, the term of this patent is extended or adjusted under 35 U.S.C. 154(b) by 0 days.

(21) Appl. No.: 15/772,753

(22) PCT Filed: Nov. 3, 2016

(86) PCT No.: PCT/CN2016/000604
§ 371 (c)(1),
(2) Date: May 1, 2018

(87) PCT Pub. No.: WO2017/075907
PCT Pub. Date: May 11, 2017

(65) Prior Publication Data
US 2019/0217971 A1  Jul. 18, 2019

(51) Int. Cl.
*B64F 1/36* (2017.01)
*B64C 39/02* (2006.01)
(Continued)

(52) U.S. Cl.
CPC ............ *B64F 1/368* (2013.01); *A47G 29/141* (2013.01); *B64C 39/024* (2013.01); *B64D 1/02* (2013.01);
(Continued)

(58) Field of Classification Search
CPC . E04B 1/34; E04B 1/3405; E06B 7/32; B64F 1/368; E05G 7/008
See application file for complete search history.

(56) References Cited

U.S. PATENT DOCUMENTS 3,682,113 A * 8/1972 McClellan .............. E05G 7/008
109/19
4,217,833 A * 8/1980 Sukolics ................ A47G 29/14
109/19
(Continued)

FOREIGN PATENT DOCUMENTS

CN   102358434 A   2/2012
CN   104494503 A   4/2015
(Continued)

*Primary Examiner* — Christine T Cajilig
(74) *Attorney, Agent, or Firm* — Inventa Capital PLC

(57) ABSTRACT

A retractable docking platform and parcel receptacle apparatus for delivery drones, including one or more telescopic sliding platform panels; adapted to slide between an extended position and a retracted position wherein in operation, a parcel can be delivered by a drone to the extended platform and on completion of delivery, the platform and parcel are retracted into the building for collection from a secure receptacle. The operation can be coordinated through a wireless system via remote signals sent by the drone and/or a drone operation center which also records addresser and addressee details and information including time of delivery, mass and scanned information to verify delivery. The platform can also communicate with the drone to verify its identity for secure delivery. The platform may send delivery confirmation to the customer receiving a parcel.

12 Claims, 5 Drawing Sheets

(51) Int. Cl.
*B64D 1/02* (2006.01)
*A47G 29/14* (2006.01)
*B64F 1/02* (2006.01)
*B64F 1/00* (2006.01)

(52) U.S. Cl.
CPC ............... *B64F 1/007* (2013.01); *B64F 1/02* (2013.01); *A47G 2029/146* (2013.01); *A47G 2029/149* (2013.01); *B64C 2201/027* (2013.01); *B64C 2201/128* (2013.01); *B64C 2201/182* (2013.01); *B64C 2201/201* (2013.01)

(56) References Cited

U.S. PATENT DOCUMENTS

| | | | | |
|---|---|---|---|---|
| 5,802,991 | A * | 9/1998 | Brown | E05G 7/008 |
| | | | | 109/19 |
| 6,789,860 | B1 * | 9/2004 | DePietro | E05G 7/008 |
| | | | | 109/19 |
| 10,124,912 | B2 * | 11/2018 | Walsh | B64F 1/32 |
| 2016/0101874 | A1 * | 4/2016 | McKinnon | B64F 1/007 |
| | | | | 244/114 R |
| 2018/0244404 | A1 * | 8/2018 | Park | B64F 1/007 |
| 2018/0354733 | A1 * | 12/2018 | Preston | E04G 3/28 |

FOREIGN PATENT DOCUMENTS

| | | | | |
|---|---|---|---|---|
| CN | 104986338 | * | 10/2015 | |
| CN | 104986338 A | | 10/2015 | |
| FR | 2937369 A1 * | | 4/2010 | ............... E06B 7/32 |
| JP | 200813187 A | | 1/2008 | |
| WO | WO-2015103411 A1 * | | 7/2015 | ............... B64F 1/32 |

* cited by examiner

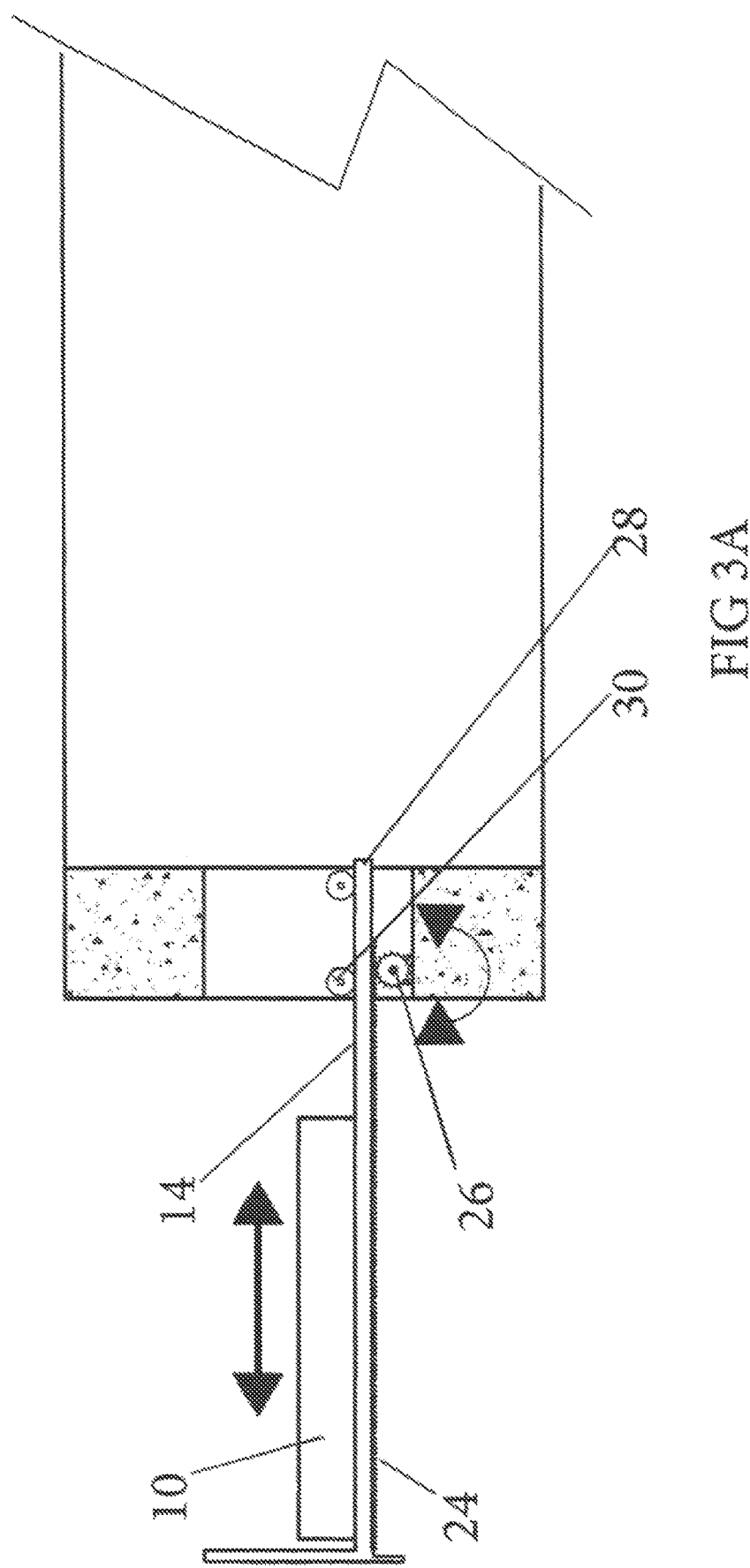

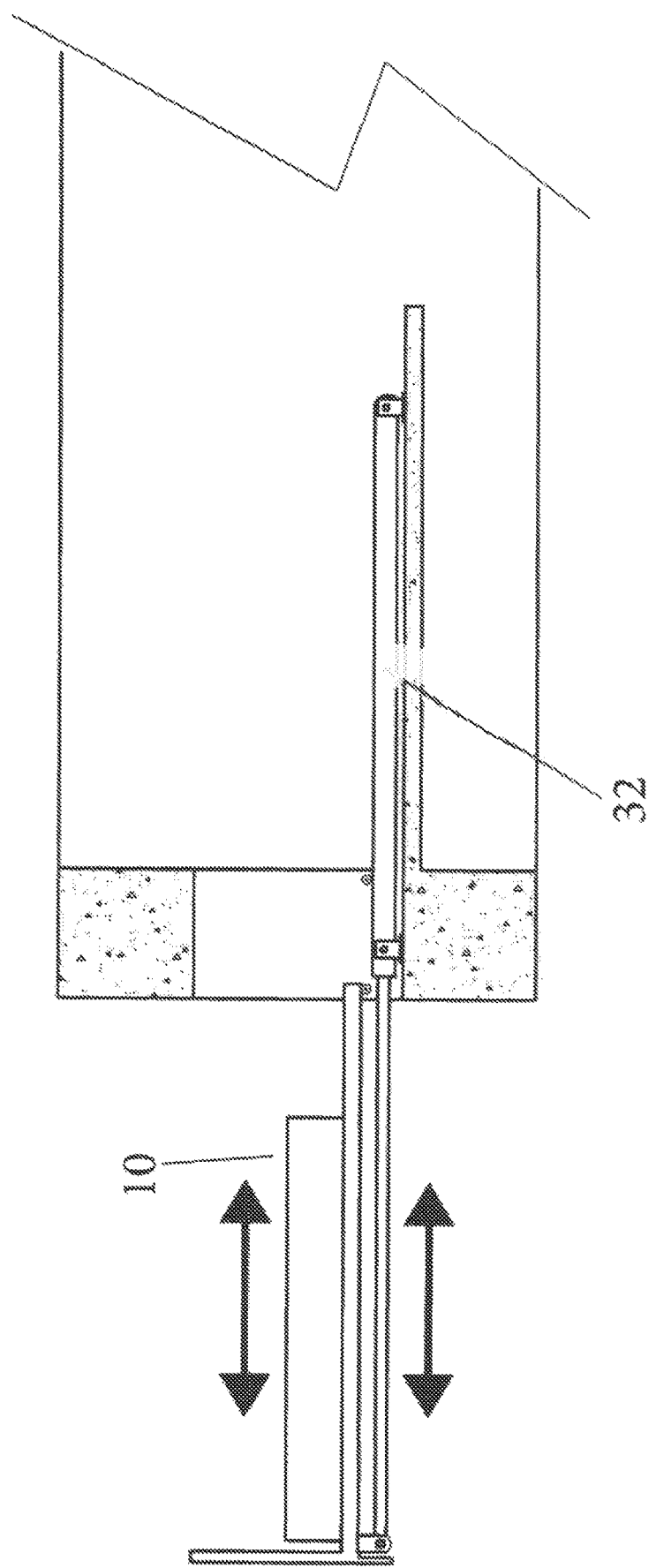

EXTENDABLE AND RETRACTABLE PARCEL RECEIVING APPARATUS FOR DELIVERY DRONES

FIELD OF THE INVENTION

This invention relates to the delivery and receipt of goods, in particular, it relates to an extendable and retractable docking platform and parcel receptacle apparatus for unmanned aerial delivery drones, adapted to be installed in buildings.

BACKGROUND OF THE INVENTION

The use of unmanned aerial drones to deliver an expanding range of products is becoming more and more efficient. Although there are some prior art devices which at ground level can be used as receptacles for delivered goods there has been no disclosures of extendable and retractable receptacle docking bays for use in multi-storey buildings or fixed above the ground on the vertical or near vertical elements of single-storey buildings. Delivery at ground level can be subject to theft or even damage or theft of the drone. Furthermore, building by laws seldom permit added structures which affect the aesthetics of a building. For example a prior art example of a drone landing pad as disclosed in WO 2015/103411 (Blacknight Holdings, LLC) would rarely be permitted in a multi-storey building as a plurality of the fixed shelves would significantly detract from the outward appearance of the building itself. In addition, the shelves would also provide platforms for cat burglars intent on climbing into high rise apartments and office blocks. Furthermore permanent fixed platforms would be a likely nesting place for birds and city vermin They would constitute a hazard in severe winds and promote ice formation over city streets. In some cases, it is not feasible to attach bracing for platforms to external cladding such as glass curtain wall buildings. It is therefore a general object of the present mention to seek to eliminate or ameliorate the disadvantages and limitations of the prior art. It is however a specific objective to provide an efficient and inventive retractable docking platform and parcel receptacle apparatus for delivery drones.

SUMMARY OF THE INVENTION

In one aspect, the invention resides in an extendable and retractable docking platform and parcel receptacle apparatus for delivery drones, including: one or more substantially horizontally disposed planar platform panels;

sliding means adapted to enable the one or more panels to slide between an extended parcel delivery position and a retracted parcel collection position;

electro-mechanical means to extend and retract the one or more panels and to any position there between;

a chassis or housing in which the panels sliding means and electro-mechanical means are mounted and housed; the chassis or housing adapted to be installed in an aperture in a wall of a building.

wherein in operation, a parcel is delivered by drone to the platform in the extended position and on completion of delivery, the platform with the parcel is retracted into the building for collection.

Preferably, the one or more substantially horizontally disposed planar platform panels are in a telescopic and/or nested arrangement.

Preferably, the sliding means comprises a pair of sliding rail and roller members disposed substantially on opposite sides of the one or more panels.

Preferably the electro-mechanical means to extend and retract the one or more panels and to any position there between includes one or more electric motor driven linear drives.

Preferably the electro-mechanical means to extend and retract the one or more panels and to any position there between includes an electrically driven rack and pinion mechanism.

Preferably, the one or more panels have fixed sidewalls to afford protection to and facilitate safe landing of drones in high winds and to effect secure placement of and to deter or prevent unauthorized sideways access to parcels.

More preferably, the one or more panels have sidewalls deployable between a prone and an upright position to afford protection to and facilitate safe landing of drones in high winds; to effect secure placement of and to deter or prevent unauthorized sideways access to parcels.

Preferably, the platform has a front panel which matches the external cladding of the building wherein when the platform is fully retracted, there is little if no indication of the presence of the invention. For example, internal fixture behind glass curtain cladding is possible wherein the platforms can have a glass outside front panel which is able to be aligned with the glass facade of the building to conceal the retractable docking platform when it is not being deployed.

Preferably the chassis or housing comprises a substantially weather resistant outer case with an inner frame including bracket mounts for the sliding means, panels and any side walls, electro-mechanical means and any other associated components.

Suitably, there is a secure lockable parcel collection receptacle inside the building providing authorized access.

Preferably, there is a controller to control the electro-mechanical means wherein a first wireless signal indicating an arriving drone causes the platform to move to the parcel delivery position, and a second signal on completion of delivery causes the platform with the parcel to retract into the building.

Preferably this operation is coordinated through a wireless system via signals emitted by the drone on arrival and departure. This communication may be two way between the drone and the receiving platform using any of the communication methods such as FM radio or Bluetooth or similar.

More preferably, the operation is coordinated through a wireless system via remote signals sent by a drone operation center which records addresser and addressee details and information including time of delivery mass and scanned information to verify delivery, wherein on completion of delivery, the drone operation center advises the addressee of successful delivery by SMS, email or other real time communication service.

Furthermore the retracted platform with the collected parcel contained within can activate an alert means such as a sound device and/or a flashing light to alert addressees of delivery. An SMS or email can be sent to the customer receiving the parcel notifying time of delivery and identification of parcel delivered.

The platform and apparatus can be mounted on a balcony or other suitable area of a building providing it is securely fixed to the structure and able to withstand maximum winds during bad weather.

BRIEF DESCRIPTION OF THE DRAWINGS

In order that the invention be understood, reference is made to the accompanying drawing wherein:

FIGS. 3A and 3B show detail of different electro-mechanical mechanisms.

DETAILED DESCRIPTION OF THE EMBODIMENT

Figure 1:
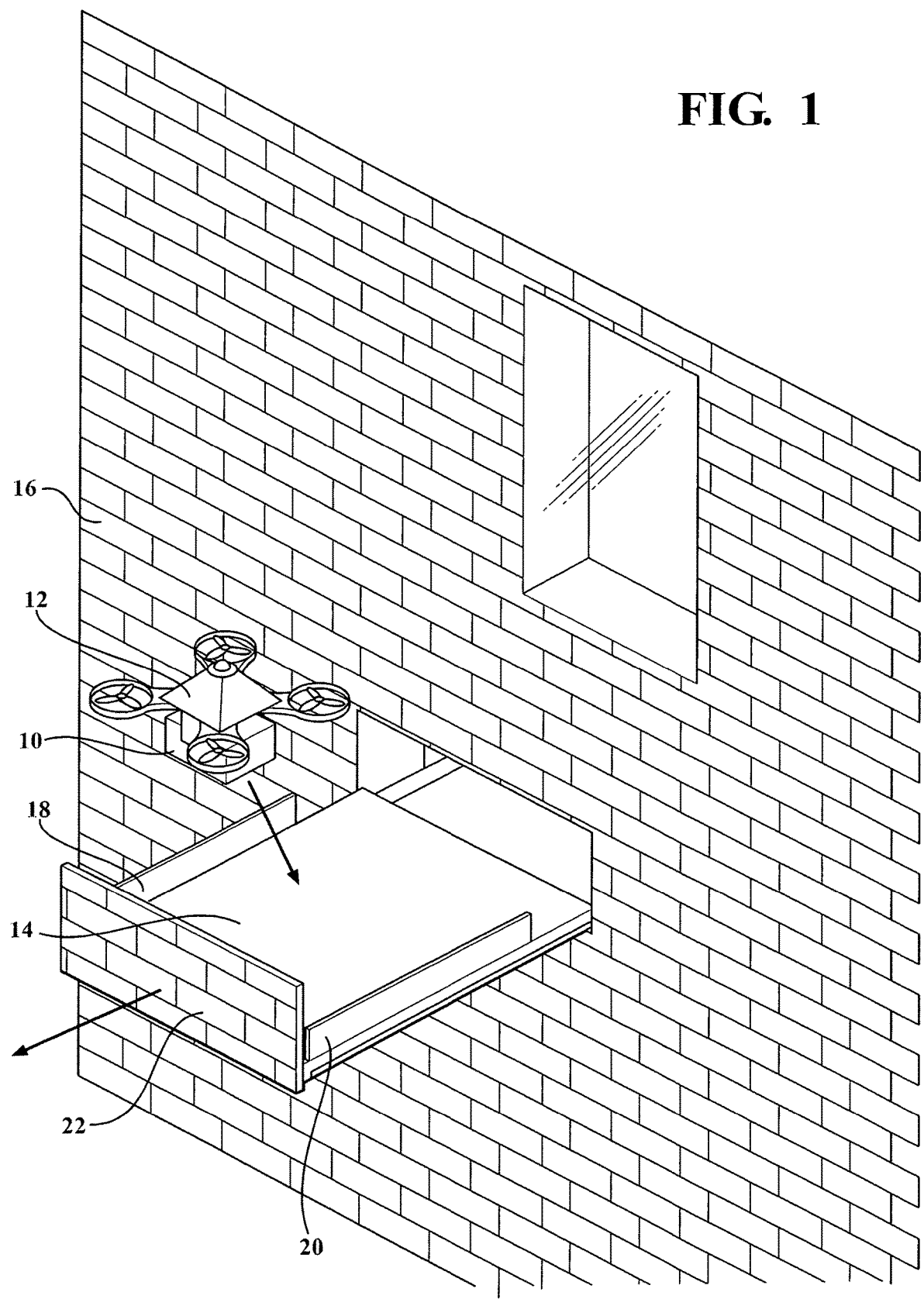
FIG. 1 shows the invention in the extended operational position.
Figure 2:
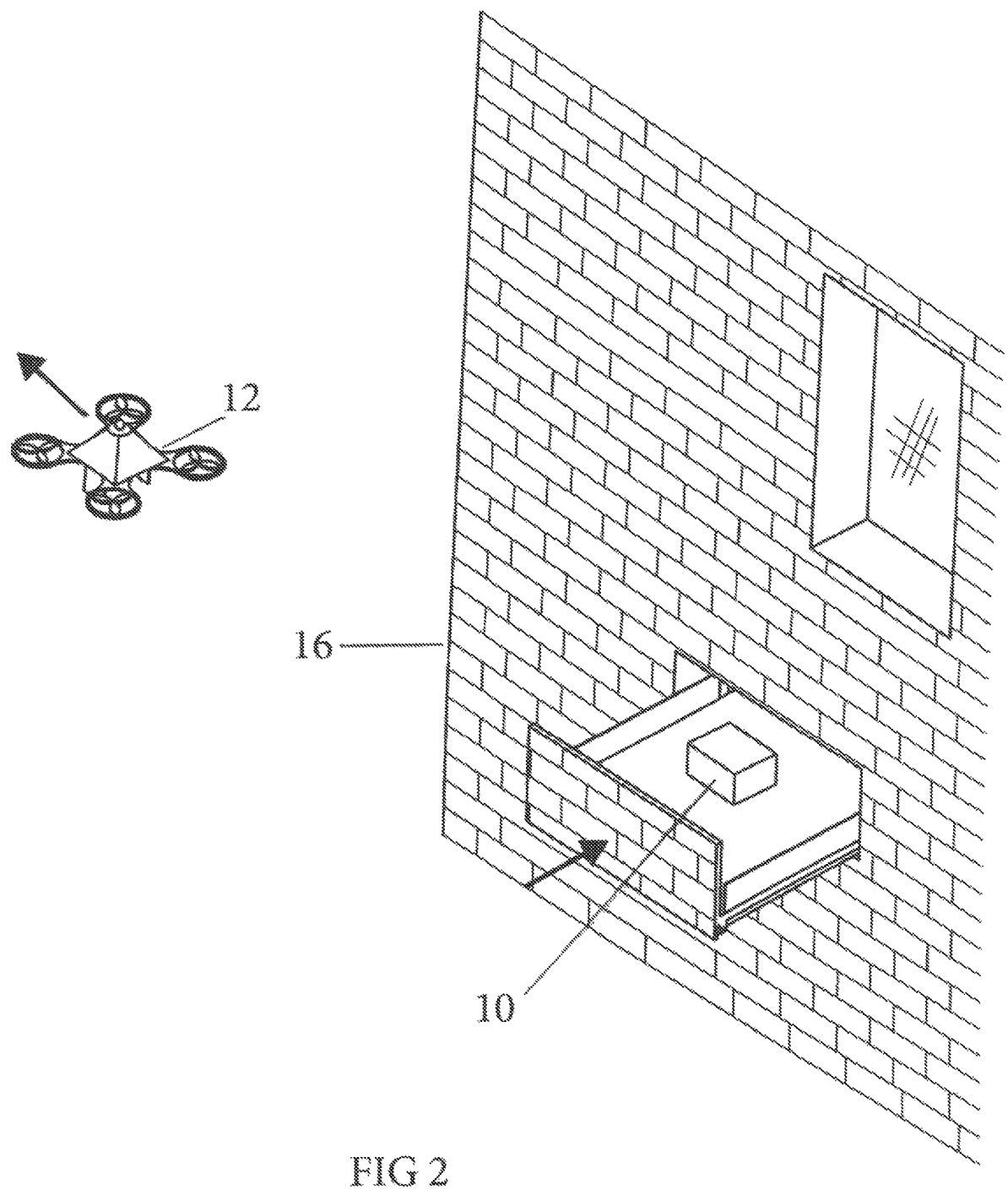
FIG. 2 shows the Invention retracting with a parcel.

The numbering system is consistent throughout the illustrations with the same parts in each drawing labelled with the same numeral. Referring to FIGS. 1 and 2 there is shown the invention in the extended docking and the post delivery retracting positions respectively. Parcel 10 is delivered by drone 12 to platform 14 in the extended position. On completion of delivery, the platform with the parcel is retracted into the building 16 for collection.

The extendable and retractable docking platform comprises telescopic platform panels and have hinged sidewalls 18, 20 deployable between a prone and an upright position to and facilitate safe landing of drones in high winds. The sidewalls which may be fixed also effect secure placement of and deter unauthorized access to parcels.

The platform has a front panel 22 which matches the external brick cladding of the building 16 to conceal. The retractable docking platform when it is not being deployed.

FIGS. 3A and 38 show detail of a rack and pinion, and a hydraulic activated electro-mechanical mechanism to extend and retract the platform 14 and parcel 10, respectively. In FIG. 3A the rack 24 is located below platform 14 which is driven between the extended and the retracted positions by pinion gear 26 on an electric motor with reduction gearbox (not shown). The sliding means comprises a single rail or sets of rails and rollers 28, 30 disposed substantially on opposite sides of the platform 14.

In the alternative, the electro-mechanical means to extend and retract the platform includes one or more hydraulic or pneumatic activators or electric motor driven linear drives 32 shown in FIG. 3B.

Figure 4:
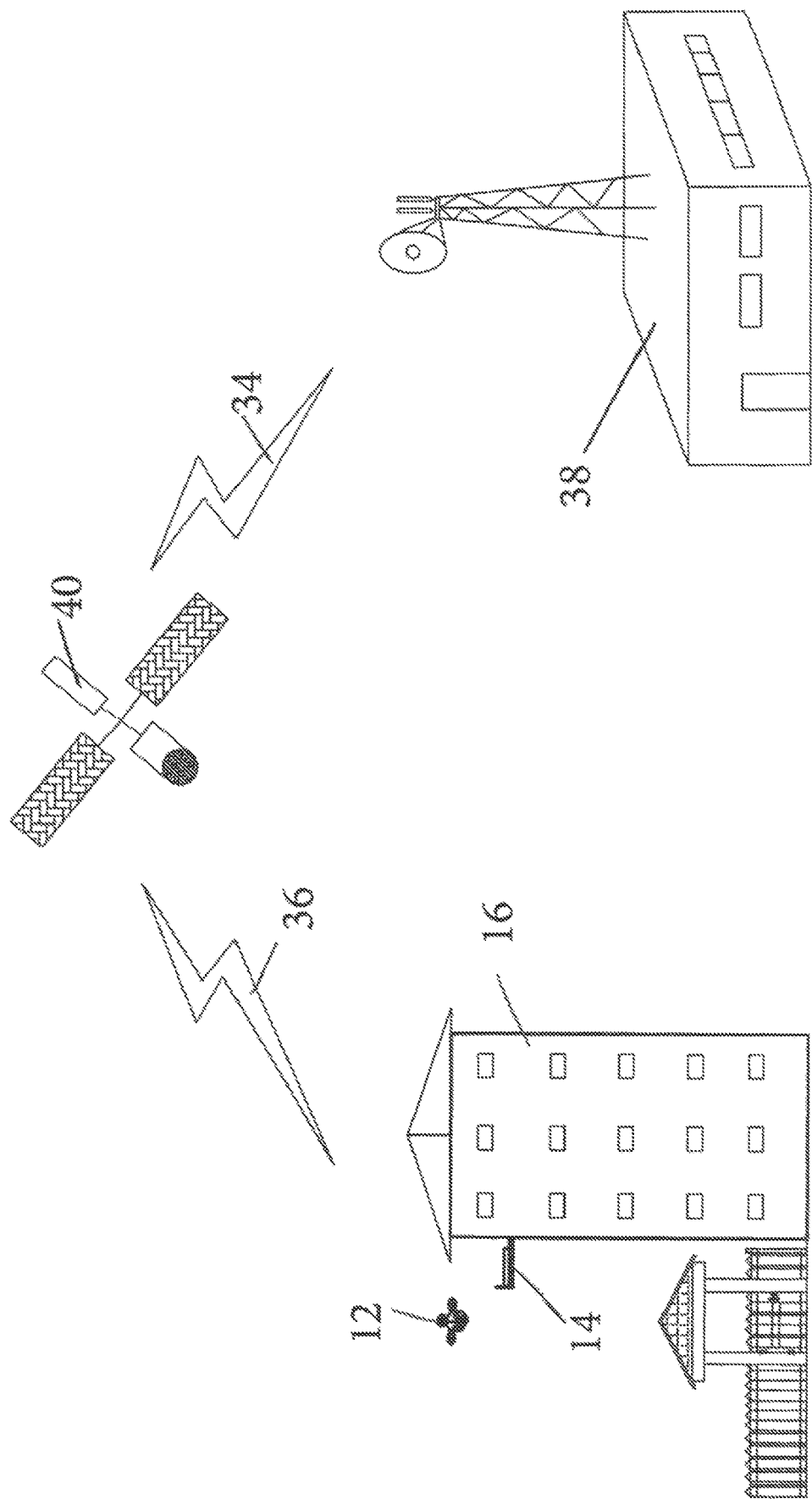
FIG. 4 shows a remote and wireless control of the invention.

Shown schematically in FIG. 4, as previously discussed, the operation is preferably coordinated through a wireless system via signals emitted by the drone 12 on arrival and departure from platform 14 on building 16. More preferably, the operation is coordinated through a wireless system via remote signals 34, 36 sent by a drone operation center 38 which records addressor and addressee details and information including time of delivery, mass and scanned information to verify delivery, wherein on completion of delivery the drone operation center advises the addressee of successful delivery by SMS, email or other real time communication service including a satellite 40 or web based protocol system.

It must be emphasized that the principal advantage of the invention is the overriding benefit of being able to safely and securely deliver parcels to multi storey buildings via unmanned aerial drones to an extendable and retractable docking platform and parcel receptacle apparatus which when fully retracted is concealed in the building's facade.

It will of course be realized that while the foregoing has been given by way of illustrative example of this invention, all such and other modifications and variations thereto as would be apparent to persons skilled in the art are deemed to fall within the broad scope and ambit of this invention as is herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

The invention claimed is:

1. An extendable and retractable docking system for receiving a parcel from a delivery drone, including:
    a. a platform having one or more substantially horizontally disposed planar panels wherein the one or more panels have sidewalls deployable between a prone and an upright position;
    b. sliding means adapted enable the platform to slide between an extended parcel delivery position and a retracted parcel collection position;
    c. electro-mechanical means to extend and retract the platform and to any position there between;
    d. a chassis or housing in which the panels, sliding means and electro-mechanical means are mounted and housed; and
    e. the chassis or housing adapted to be installed in an aperture in a wall of a building, such that a parcel is capable of being delivered by drone to the platform in the extended position and on completion of delivery, the platform with the parcel is capable of being retracted into the building for collection.

2. The system of claim 1, wherein the one or more substantially horizontally disposed planar platform panels are in a telescopic and/or nested arrangement.

3. The system of claim 1, wherein the sliding means comprises a single set or plural sets of sliding rail and roller members disposed substantially on opposite sides of the one or more panels.

4. The system of claim 1, wherein the electro-mechanical means to extend and retract the one or more panels and to any position there between includes one or more hydraulic or pneumatic activators.

5. The system of claim 1, wherein the electro-mechanical means to extend and retract the one or more panels and to any position there between includes an electrically driven rack and pinion mechanism or an electric motor driven linear drive.

6. The system of claim 1, wherein the one or more panels have fixed sidewalls.

7. The system of claim 1, wherein the platform has a front panel adapted to match an external cladding of the building to conceal the retractable docking platform when it is not being deployed.

8. The system of claim 1, where in the chassis or housing comprises a substantially weather resistant outer case with an inner frame including bracket mounts for the sliding means, panels and any side walls, electro-mechanical means and any other associated components.

9. The system of claim 1, further comprising a controller to control the electro-mechanical means is capable of sending a first wireless signal to indicate an arriving drone thereby causing the platform to move to the extended parcel delivery position, and a second signal is capable of being received after delivery is completed to move the platform with the parcel into the building.

10. The system of claim 9, wherein a wireless remote signals is capable of being sent by a drone operation center which records addressor and addressee details and information including time of delivery, mass and scanned information to verify delivery, wherein on completion of delivery, the drone operation center advises the addressee of successful delivery by SMS, email or other real time communication service.

11. The system of claim 9, wherein the platform is fitted with communication devices so that the platform can receive signals from and send signals to the drone to enable verification that the drone is expected and advice to the drone that the parcel will be accepted.

12. The platform of claim 1, wherein a parcel can be placed into the platform and then pushed outward by the electro-mechanical means so that it is ready to be collected by a drone.

\* \* \* \* \*